(12) United States Patent
Sattler et al.

(10) Patent No.: US 12,115,742 B2
(45) Date of Patent: Oct. 15, 2024

(54) APPARATUS AND METHOD FOR TREATING A MOULDED ARTICLE MADE OF PLASTIC WITH VAPOUR OF A TREATMENT LIQUID

(71) Applicant: WashTec Holding GmbH, Augsburg (DE)

(72) Inventors: Andreas Sattler, Munich (DE); Stefan Mayer, Neusaess (DE)

(73) Assignee: WashTec Holding GmbH, Augsburg (DE)

( * ) Notice: Subject to any disclaimer, the term of this patent is extended or adjusted under 35 U.S.C. 154(b) by 298 days.

(21) Appl. No.: 17/778,151

(22) PCT Filed: Oct. 15, 2020

(86) PCT No.: PCT/EP2020/079113
§ 371 (c)(1),
(2) Date: May 19, 2022

(87) PCT Pub. No.: WO2021/099039
PCT Pub. Date: May 27, 2021

(65) Prior Publication Data
US 2022/0410510 A1    Dec. 29, 2022

(30) Foreign Application Priority Data
Nov. 20, 2019  (EP) ..................................... 19210442

(51) Int. Cl.
*B29C 64/00*    (2017.01)
*B29C 64/364*    (2017.01)
(Continued)

(52) U.S. Cl.
CPC ........ *B29C 71/0009* (2013.01); *B29C 64/364* (2017.08); *B33Y 40/20* (2020.01)

(58) Field of Classification Search
CPC .......................... B29C 71/0009; B29C 64/364
See application file for complete search history.

(56) References Cited

U.S. PATENT DOCUMENTS 3,737,499 A    6/1973  Kamena
3,807,054 A    4/1974  Joseph et al.
(Continued)

FOREIGN PATENT DOCUMENTS

CA    3068547 A1    12/2018
CN    1662354 A    8/2005
(Continued)

OTHER PUBLICATIONS https://www.instructables.com/Ultrasonic-Misting-3D-Printing-Vapor-Polisher/ (Year: 2015).*

(Continued)

*Primary Examiner* — Nicholas R Krasnow
(74) *Attorney, Agent, or Firm* — Christopher A. Rothe; CM Law (57) ABSTRACT

An apparatus and method for treating a plastic molded article. The apparatus includes a treatment chamber that can be closed and temperature-controlled. A vapor generating unit generates vapor of a treatment liquid. A fluid connection between the treatment chamber and the vapor generating unit feeds vapor to the treatment chamber and returns condensate back to the treatment chamber. A pressure equalizing device transfers waste air at atmospheric pressure and equalizes pressure with the atmospheric pressure during treatment. The pressure equalizing device retains vapor and prevents vapor from escaping into the atmosphere. A vapor phase is generated by heating a treatment liquid to its boiling point. The treatment liquid includes a solvent that dissolves or solubilizes the plastic. The article is exposed to the vapor phase for a predetermined time and removed from the vapor phase. Residual treatment liquid present on the article is removed.

18 Claims, 5 Drawing Sheets

(51) Int. Cl.
  B29C 71/00   (2006.01)
  B33Y 40/20   (2020.01)

(56) References Cited

U.S. PATENT DOCUMENTS

| | | | |
|---|---|---|---|
| 4,529,563 A | 7/1985 | McGinniss | |
| 5,448,838 A | 9/1995 | Edmonds | |
| 2005/0173838 A1* | 8/2005 | Priedeman | B29C 64/124 |
| | | | 264/401 |
| 2009/0321972 A1 | 12/2009 | Zinniel | |
| 2012/0227879 A1 | 9/2012 | Muhlhoff et al. | |
| 2015/0145171 A1* | 5/2015 | Walker | B33Y 40/20 |
| | | | 425/150 |
| 2018/0065303 A1 | 3/2018 | Schade | |
| 2018/0178241 A1 | 6/2018 | Luo et al. | |
| 2018/0194086 A1 | 6/2018 | Alves | |
| 2018/0200924 A1 | 7/2018 | Zhang et al. | |
| 2019/0375158 A1 | 12/2019 | Crabtree et al. | |
| 2021/0187852 A1* | 6/2021 | Martinez Gonzalez | |
| | | | B29C 71/0009 |
| 2022/0234296 A1* | 7/2022 | Feller | B29C 71/009 |
| 2023/0330928 A1 | 10/2023 | Arienti et al. | |
| 2023/0391003 A1* | 12/2023 | Sweeney | B33Y 30/00 |
| 2023/0415419 A1* | 12/2023 | Liao | B29C 64/259 |
| 2024/0091906 A1* | 3/2024 | Singh | B24C 3/28 |

FOREIGN PATENT DOCUMENTS

| | | | |
|---|---|---|---|
| CN | 108284597 A | 7/2018 | |
| CN | 110382211 A | 10/2019 | |
| CN | 110799326 A | 2/2020 | |
| CN | 107791517 A | 3/2022 | |
| FR | 2950552 A1 | 4/2011 | |
| FR | 3056146 A1 | 3/2018 | |
| RU | 2625848 C1 | 7/2017 | |
| WO | 2018127683 A1 | 7/2018 | |
| WO | 2018235121 A1 | 12/2018 | |
| WO | 2020007442 A1 | 1/2020 | |
| WO | 2020007443 A1 | 1/2020 | |
| WO | 2020007444 A1 | 1/2020 | |

OTHER PUBLICATIONS https://www.soliforum.com/topic/448/diy-smoothing-station-ii/ (Year: 2012).*
https://www.reddit.com/r/3Dprinting/comments/4prbn4/diy_fully_automated_vapor_polisher/ (Year: 2014).*
Search Reported received in European Application No. 19210442.0-1017 dated May 26, 2020, with translation, 10 pages.
Search Report received in International Application No. PCT/EP2020/079113 dated Jan. 21, 2021, with translation, 7 pages.
Written Opinion received in International Application No. PCT/EP2020/079113 dated Jan. 21, 2021, with translation, 15 pages.
Office Action received in Chinese Application No. 202080080168.1 dated Nov. 10, 2023, with translation, 18 pages.
Notice of Allowance received in Chinese Application No. 202080080168.1 dated Apr. 11, 2024, with translation, 6 pages.

* cited by examiner

APPARATUS AND METHOD FOR TREATING A MOULDED ARTICLE MADE OF PLASTIC WITH VAPOUR OF A TREATMENT LIQUID

CROSS-REFERENCE TO RELATED APPLICATIONS

This application is the United States national stage entry of International Application No. PCT/EP2020/079113, filed Oct. 15, 2020, and claims priority to European Application No. 19210442.0, filed Nov. 20, 2019. The contents of International Application No. PCT/EP2020/079113 and European Application No. 19210442.0 are incorporated by reference herein in their entireties.

FIELD

The present invention relates to an apparatus and a method for treating a molded article made of plastic with vapor of a treatment liquid, in particular it relates to an apparatus for an automatic treatment of molded articles made of plastic and obtained by means of additive manufacturing with a solvent vapor, and to a post-treatment method for molded articles made of plastic and obtained by means of additive manufacturing.

BACKGROUND

During the additive manufacturing, a three-dimensional molded article is built up layer by layer out of a material so that thereby also complex geometries can be produced. In this manufacturing process, which is also often referred to as 3D printing, the desired geometry is formed by an adding, applying and depositing of a substance in layers, wherein physical or chemical curing or hardening processes or melting processes are deployed. Typical materials are for instance plastics, ceramics and metals.

The surface of a molded article manufactured in this way is often relatively rough, and usually the layer structure resulting from the manufacturing process is recognizable. If a high surface quality or finish quality is desired in order to satisfy either optical or functional requirements, it is therefore necessary to smooth the surface by means of a post-processing. Most commonly, a mechanical reworking as for instance grinding or polishing, or a painting (varnishing), or a combination of both is employed. For specific polymers (e.g. ABS) also the use of solvents is known, wherein, in the course of this, in general skilled manual or technical processes with a minimum process control and very long process times are deployed. The solvent is either spread by means of a brush on the molded article to be processed, or the molded article will be immersed into the solvent for a short time. However, in particular in the case of complex geometries and contours a surface smoothing is difficult as not all surface sections are equally accessible.

For molded articles which have been produced from an ABS plastic, i.e. an acrylonitrile butadiene styrene copolymer, by means of additive manufacturing, furthermore a method is used in which the molded article will be kept in an enclosed space along with acetone for a predetermined period of time and without the liquid acetone and the molded article being in direct contact with each other. Acetone has the ability to dissolve or solubilize the ABS plastic. Due to its high volatility, acetone spreads in the enclosed space even without any additional heating, and in doing so it comes into contact with the surface of the molded article and solvates or solubilizes the material, whereby the surface of the molded article is smoothed.

An apparatus and a method for smoothing the surface of three-dimensional molded articles made of a polymer material or a wax material are known from US 2009/0 321 972 A1. The apparatus includes a housing and in the interior of the housing a vapor chamber and a drying chamber. The vapor chamber can be heated so that the supplied solvent vaporizes and the vapor chamber is filled with solvent vapor. The vapor softens the material of the molded article and smooths the surface of the molded article. In the interior of the vapor chamber there is further provided a cooling element by means of which the upper boundary of the vapor chamber is accomplished. After the treatment in the vapor chamber the molded article is transferred to the drying chamber for drying, the drying chamber being separate from the vapor chamber. In the interior of the housing in the upper section thereof a further cooling element is provided by which an upper delimitation of the vapor chamber in the entire housing is implemented. The treatment will be continued until there is no more condensation of solvent vapor on the surface of the molded article. Then at least the surface of the molded article has reached the temperature of the boiling solvent.

In U.S. Pat. Nos. 3,737,499 A and 3,807,054 A, the treatment of plastic articles with solvent vapor is described, wherein the articles to be treated are moved through different zones of the used apparatus during the treatment.

WO 2018/127 683 A1 discloses an apparatus for post-processing an additively manufactured polymer part, comprising a reservoir for containing a liquid solvent, a processing chamber in fluid communication with the reservoir, an element for heating and vaporizing the solvent, and a vacuum pump for lowering the pressure in the interior of the processing chamber. By means of a controller the processing can be performed according to correspondingly predefined processing programs. During the processing, the pressure in the interior of the processing chamber is lowered and the temperature of the polymer part is kept at a lower level than the temperature of the solvent vapor. In addition, the polymer part can selectively be cooled.

A further apparatus for a surface finishing of molded articles obtained by additive manufacturing and a corresponding method are known from WO 2018/235 121 A1. The molded article and a treatment liquid are heated together in an hermetically sealed treatment chamber up to a working temperature which is lower than the boiling temperature of the treatment liquid, so that the formation of condensate on the surface of the molded article is avoided and so that it is allowed that the vapors of the treatment liquid can be absorbed by the surface of the molded article without any condensate formation. In doing so, the air/vapor mixture is maintained in continuous circulation in the chamber. The treatment chamber comprises a heating means and a means for circulating the air/vapor mixture in the chamber. The treatment time ranges from 20 to 60 minutes. The working pressure in the chamber equals the atmospheric pressure plus the vapor pressure of the treatment liquid and can range from 125 to 150 kPa. The treatment can, however, also be performed at a working pressure which is lower than the atmospheric pressure.

Furthermore, a method and a device for post-processing of plastic products by means of smoothing the surface utilizing solvent vapor are described in WO 2020/007 442 A1, WO 2020/007 443 A1 and WO 2020/007 444 A1. A solvent is vaporized by heating in a closed chamber, the resultant solvent vapor is circulated inside the chamber in the direction from the bottom to a top, the solvent vapor is discharged from the chamber, and the solvent condenses outside the chamber. The walls of the chamber can be heated up to a temperature which is higher than the dew point in order to prevent condensation of the solvent thereat. The device also comprises a vacuum pump for lowering the pressure in the chamber by 300 to 800 mbar during the treatment.

In the above described methods and apparatuses for smoothing the surface, the process control is, however, inadequate so that it is difficult to guarantee reproducible results. Moreover, usually the treatment times are too long to make their use in industrial production seem to be reasonable. And the methods of the application of solvent vapors known so far only allow the processing of few materials.

When larger numbers of molded articles produced by means of additive manufacturing and being of a high quality are required, a rapid post-processing combined simultaneously with a good reproducibility is demanded. There is, therefore, a need to provide a method which is improved in that regard and to provide an apparatus for the automatic treatment of plastic components obtained by additive manufacturing.

That is why the object of the present invention is to provide a method and an apparatus for treating a molded article made of plastic, which allow a fast and reproducible processing and smoothing of the surface of the molded article.

SUMMARY

Specifically, there is provided an apparatus for treating a molded article made of plastic with vapor of a treatment liquid, wherein the apparatus comprises:
  at least one treatment chamber which is closable and can be temperature-controlled for accommodating and treating the molded article,
  at least one vapor generating unit for providing vapor of a treatment liquid, the vapor generating unit being spatially separate from the treatment chamber,
  at least one fluid connection between the treatment chamber and the vapor generating unit which can be shut off and is suitable for feeding vapor of treatment liquid to the treatment chamber and returning condensate back to the treatment chamber, and
  a pressure equalising device for transferring waste air at atmospheric pressure, which device is suitable for enabling pressure equalisation with the atmospheric pressure during the treatment, and which includes a device which retains vapor of treatment liquid and is suitable for preventing the escape of vapor of treatment liquid into the atmosphere.

According to a preferred embodiment, the treatment chamber comprises a closable opening for loading the treatment chamber with the molded article to be treated, at least one inlet and at least one outlet for a vapor of treatment liquid, one outlet for condensed treatment liquid, and a heating element as well as a cooling element for the temperature control of the interior of the treatment chamber.

In addition, the treatment chamber preferably includes an inlet for a purge gas.

Furthermore, the vapor generating unit preferably comprises a container for storing, i.e. holding available the treatment liquid, a heating element for heating the treatment liquid to its boiling point, a pressure increasing device for increasing the pressure of the vapor of treatment liquid by a predetermined pressure, and a cooling element for condensing excess vapor of treatment liquid.

Preferably, the at least one fluid connection which can be shut off comprises devices for feeding the vapor of treatment liquid from the vapor generating unit to the treatment chamber, for returning vapor of treatment liquid from the treatment chamber back to the vapor generating unit and for returning condensed treatment liquid from the treatment chamber back to the vapor generating unit, wherein the devices for feeding and returning include shut-off devices.

The at least one fluid connection which can be shut off furthermore preferably comprises a device for feeding purge gas to the treatment chamber.

Moreover, the apparatus according to the invention also includes a control unit for controlling the flows of vapor of treatment liquid between the treatment chamber and the vapor generating unit, the returning of condensed treatment liquid from the treatment chamber back to the vapor generating unit, the heating element of the vapor generating unit, and the temperature in the interior of the treatment chamber.

Preferably, the control unit is also configured to control the feeding of purge gas to the treatment chamber.

Furthermore, the apparatus according to the invention also includes an operating unit for selecting or setting relevant parameters for the treatment of the molded article.

According to the present invention there is furthermore provided a method for treating a molded article made of plastic, wherein the method comprises the following steps:
  a) generating a vapor phase by heating a treatment liquid to its boiling point, the treatment liquid comprising at least one solvent which is able to dissolve or solubilize the plastic,
  b) a treatment step in which the molded article to be treated is exposed to the vapor phase generated in step a) for a predetermined treatment time, by preferably feeding the generated vapor of treatment liquid to the molded article, and
  c) removing the molded article from the vapor phase and removing residual treatment liquid present on the surface of the treated molded article.

The method according to the invention is preferably carried out by using the apparatus according to the invention. Thus, the measures and features indicated in the following with regard to the method according to the invention also apply to the apparatus according to the invention, and the measures and features indicated in the following with regard to the apparatus according to the invention also apply to the method according to the invention.

In the method according to the invention the treatment of the molded article is preferably carried out in a treatment chamber of a suitable apparatus, wherein the vapor phase as generated in step a) is fed to the treatment chamber from the outside, and the steps b) and c) are also carried out in the same treatment chamber. Thereby it can be avoided to have to transport the molded article before the entire treatment has been completed, in order to guarantee that the treated surface of the molded article will not be damaged. For this purpose, the apparatus according to the invention preferably includes a device in the treatment chamber for positioning the molded article during the entire treatment.

The treatment chamber of the apparatus according to the invention preferably comprises a closable opening, preferably a door or a flap, which can be opened for loading the treatment chamber with the molded article to be treated and for removing or taking out the treated molded article. During the treatment, the opening is in a closed state and is preferably locked for safety reasons. Advantageously, the treatment chamber is hermetically sealed so that no vapors of treatment liquid can escape in an uncontrolled manner. Preferably, the treatment chamber is thermally insulated. The treatment chamber includes at least one inlet for vapor of treatment liquid, said inlet for vapor of treatment liquid being preferably arranged and designed such that the vapor of the treatment liquid can be uniformly distributed within the chamber. In a preferred embodiment, it is provided in the treatment chamber a distribution device for distributing the vapor fed from the vapor generating unit in the interior of the treatment chamber.

The treatment chamber preferably further includes at least one outlet for vapor of treatment liquid through which vapor of treatment liquid can be returned back to the vapor generating unit during the treatment.

As during the treatment vaporous treatment liquid can condense on different surfaces in the chamber, it may be possible that treatment liquid will accumulate in the lower part of the treatment chamber. Said accumulated treatment liquid can be discharged through the outlet for condensed treatment liquid which is present in the treatment chamber, wherein said outlet preferably is designed as a slope, and said treatment liquid can be returned back to the vapor generating unit. In order to hold back solids, a filter or a sieve can be arranged before the outlet for condensed treatment liquid.

Furthermore, the apparatus according to the invention includes a device which retains vapor of treatment liquid and which is suitable for preventing the escape of vapor of treatment liquid into the atmosphere. Said device can for instance be designed as a cooling element which is provided outside of the treatment chamber and to which the vapor of treatment liquid escaping from the treatment chamber or being discharged therefrom is fed. The treatment liquid condensed by means of the cooling element can be used again in the apparatus according to the invention. The cooling element can be designed as a component of the vapor generating unit.

Furthermore, the apparatus according to the invention includes a device for pressure equalisation which can be a component of the vapor generating unit. The pressure equalising device is connected to the treatment chamber and to the atmosphere via suitable ducts. A pressure equalisation with the atmospheric pressure takes place via the pressure equalising device, and waste air can be transferred to the outside at atmospheric pressure. An exhaust system or waste air system can be arranged downstream of the pressure equalising device in order to be able to exhaust or discharge the waste air in a suitable manner.

Moreover, the treatment chamber preferably includes an inlet for a purge gas through which a preferably inert gas, as for instance argon or nitrogen, can be introduced in order to purge or flush any residual vapor of treatment liquid out of the treatment chamber to the vapor generating unit after the treatment. Thereby it can be prevented that an explosive atmosphere is formed inside the treatment chamber, and thereby above all a fast termination of the surface treatment can be achieved.

A heating element and a cooling element can be provided for the temperature control of the interior of the treatment chamber. Thereby the temperature can be regulated within the interior of the treatment chamber during the treatment, and, furthermore, the chamber and the molded article to be treated can be heated up to a defined initial temperature in a pre-treatment step before a vapor of treatment liquid will be introduced. Moreover, by means of the cooling element the molded article can be cooled down according to a defined cooling process after the actual treatment step before the molded article is taken out of the treatment chamber. Thereby the desired surface conditions can be achieved in a more targeted and reproducible manner.

In the interior of the vapor generating unit, a treatment liquid is heated to its boiling temperature by means of a heating element in order to vaporize said treatment liquid. For this purpose, treatment liquid is stored, i.e. held available in a container and the treatment liquid will be brought into contact with the heating element. By way of an example, the entire container or the entire treatment liquid held available or stored therein can be heated to its boiling point, or the treatment liquid can be transferred in a dosed manner to a heating element designed as an evaporator or vaporiser.

As a result of the fact that the used treatment liquid is heated to its boiling point, on the one hand a larger quantity of solvent is transferred into the vapor phase, and on the other hand a reproducible vapor phase being constant with regard to temperature and composition is generated. This allows shorter treatment times and more reproducible results. Moreover, as a result of this also solvents can be used which otherwise appear to be unsuitable because of their low volatility at room temperature.

By a suitable selection of the treatment time, the extent of for instance a smoothing of the surface can be specifically controlled. On the basis thereof, reproducible results can be achieved which makes the method according to the invention also suitable for the industrial application. By means of the apparatus according to the invention, a changing between the individual method steps is possible within a very short time. As the vapor generating unit holds available a sufficient quantity of vapor of the treatment liquid, the treatment chamber can be flooded with the vapor within a minimum of time. After the expiration of the predetermined treatment time, the treatment can be stopped within a minimum of time by the introduction of purge gas. Thus, short treatment times in the vapor of the treatment liquid can be achieved, large numbers of molded articles can be treated within a minimum of time, and reproducible results can be achieved.

The vapor of the treatment liquid generated by vaporizing the treatment liquid represents an atmosphere or a gas space which consists completely or at least mainly of a vaporous, i.e. gaseous treatment liquid. The treatment liquid comprises at least one solvent which is able to dissolve or solubilize the plastic. Solvents in the sense of the present application are all liquids which are able to dissolve or solubilize the plastic of which the molded article to be treated is made without giving rise to any chemical reactions between the solvent and the plastic. These solvents include, for instance, organic solvents like aliphatic hydrocarbons, aromatic hydrocarbons, ketones and esters which can or cannot be substituted, as well as inorganic and organic acids and their aqueous solutions, such as for instance formic acids and acetic acids. The substituted hydrocarbons can for instance be halogenated hydrocarbons, in particular chloroform.

The plastic from which the molded article to be treated is made is only restricted by the fact that a treatment liquid has to be available that can dissolve or solubilize said plastic, in particular at a temperature in the range of the boiling point of the treatment liquid.

The plastic is preferably a thermoplastic resin. In particular, the molded article to be treated can be made of a plastic which is selected from thermoplastic resins, as for instance acrylonitrile butadiene styrene copolymer (ABS), polypropylene (PP), polycarbonate (PC), polylactide (PLA), polyamide (PA), polyethylene terephthalate (PET) and polystyrene (PS).

Suitable combinations of plastic and solvent are for instance:

ABS+ketone (e.g. acetone, methyl ethyl ketone (MEK), methyl isobutyl ketone (MIBK));
PP+aliphatics or aromatics (e.g. benzene, toluene, xylene);
PC+ketone (e.g. acetone, methyl ethyl ketone (MEK), methyl isobutyl ketone (MIBK));
PC+chloroform;
PLA+tetrahydrofuran (THF) or dioxane; and
Polyamide 6 (PA6)+formic acid or acetic acid.

The treatment liquid to be used can consist of only one single solvent. Alternatively, the treatment liquid can be a mixture of two or more solvents, or it can be a mixture which, apart from the at least one solvent, also comprises a further liquid, wherein the further liquid is not able to dissolve or solubilize the plastic.

According to a special embodiment, the treatment liquid comprises in addition to the at least one solvent at least one further solvent and/or other liquid, and the treatment liquid forms an azeotropic mixture. An azeotropic mixture, also referred to as azeotrope, is a liquid consisting of two or more chemical compounds, wherein the equilibrium vapor phase thereof has the same composition as the liquid phase, and, therefore, it has a constant boiling point.

The advantage of the use of azeotropic mixtures is, on the one hand, that thereby the boiling temperature of the treatment liquid and, hence, also the temperature at which the molded particle will be treated can be varied, which, for given combinations of plastics and solvents, can otherwise only be achieved by means of a pressure regulation within the treatment chamber, which pressure regulation involves a complex and costly equipment. On the other hand, the solving properties of the treatment liquid in relation to the plastic of which the molded article to be treated is made, can be specifically influenced.

This can be of advantage when for instance a solvent which is principally suitable for the treatment of a molded article made of a plastic due to its solving properties has a boiling point that is so high that due to a very fast solubilizing or solvating of the surface of the molded article, i.e. due to a very high dissolving speed, a satisfactory and reproducible process control is not possible. When instead of the pure solvent an azeotropic mixture having a lower boiling point is used, the process of solubilizing or solvating and of smoothing the surface can be slowed down and thereby it can be controlled in a better manner.

In the course of this, the dissolving speed can be reduced on the one hand by the fact that already by the reduction of the boiling temperature the process of solubilizing or solvating the surface of the molded article will take place in a slowed down manner. In addition, by the dilution of the solvent there will also be effected a reduction of the dissolving speed.

The inventors of the present invention have found out that, at higher temperatures, unwanted deformations of the molded article can occur which are in part attributable to completely solvent-independent melting effects or softening effects of the polymer. Such deformations can be avoided by the use of an azeotropic mixture, as thereby the temperature during the treatment can be lowered.

Furthermore, the use of an azeotropic mixture can be of advantage in cases in which the boiling point of the solvent is so high that the plastic will start to melt or to soften at that temperature. By the use of an azeotropic mixture which has a lower boiling point than the pure solvent such a melting or softening can be prevented.

For instance, in the treatment of polypropylene (PP) with toluene the boiling temperature of toluene can be too high to achieve a good result. The use of an azeotropic mixture of toluene/acetic acid with 72% by weight of toluene and 28% by weight of acetic acid reduces the temperature of the vapor phase by approximately 10° C. and, consequently, slows down the process.

It is preferred that the boiling point of the treatment liquid lies below the softening point of the plastic of which the molded article to be treated is made. Thereby it can be prevented that, by a heat transfer from the vapor phase to the molded article, the surface of the molded article will be heated up to the softening point of the plastic and the molded article will start to melt or soften at the surface. This would make the process control clearly more difficult.

Herein as the softening point there will be regarded that temperature at which the plastic of which the molded article consists will start to be deformed due to gravity alone.

The vapor generating unit further includes a pressure increasing device by means of which the pressure of the generated vapor of the treatment liquid is increased by a predetermined pressure which is sufficient in order to be able to feed the vapor of the treatment liquid to the treatment chamber. By the excess pressure in the vapor generating unit, the generated vapor of the treatment liquid can be fed to the treatment chamber without a pump being required therefor. The pressure increase generated by the pressure increasing device preferably amounts to 5 mbar or more, further preferred it amounts to 10 mbar or more, and preferably it amounts to 200 mbar or less, further preferred it amounts to 100 mbar or less, particularly preferred it amounts to 80 mbar or less, and still further preferred it amounts to 60 mbar or less.

The excess pressure of the vapor of the treatment liquid which is generated by the pressure increasing device serves solely for the easier feeding of the vapor of the treatment liquid generated in the vapor generating unit to the treatment chamber. Thereby the pressure in the treatment chamber and, thus, also during the treatment will not be increased or will only be increased to an insignificant degree, as there exists a pressure equalisation with the atmospheric pressure via the pressure equalising device.

Furthermore, in the vapor generating unit there is provided a cooling element for condensing excess vapor of treatment liquid. The cooling element which can for instance be designed as a spiral condenser is preferably arranged in the upper part of the vapor generating unit so that a vapor of treatment liquid which is not fed to the treatment chamber will be condensed again and cannot escape to the outside. The vapor of treatment liquid which is returned from the treatment chamber back again to the vapor generating unit is preferably fed to the cooling element and will be condensed thereat.

Moreover, the vapor generating unit includes devices for filling and emptying or discharging in order to fill treatment liquid into the vapor generating unit and to be able to remove it therefrom, if necessary.

Preferably, the vapor generating unit is thermally insulated to the outside.

For the guidance of the flows of treatment liquid and of vapor of treatment liquid, the apparatus according to the invention includes devices for feeding the vapor of the treatment liquid from the vapor generating unit to the treatment chamber, for returning vapor of treatment liquid from the treatment chamber back to the vapor generating unit, for returning condensed treatment liquid from the treatment chamber back to the vapor generating unit, and for feeding purge gas to the treatment chamber. Preferably, said devices are suitable pipelines or hoses that are made of a material which is resistant to the treatment liquid and to increased temperatures.

Moreover, the devices for feeding and returning include shut-off devices like valves, for instance shut-off valves or multi-way valves, which preferably can be controlled via a control device.

Furthermore, the apparatus according to the invention includes a control unit. By means of the control unit the material flows within the apparatus can be controlled, like as for instance the flows of vapor of treatment liquid between the treatment chamber and the vapor generating unit, the returning of condensed treatment liquid from the treatment chamber to the vapor generating unit, and the feeding of purge gas to the treatment chamber. Furthermore, by means of the control unit the heating element of the vapor generating unit and, via the heating and cooling elements in the treatment chamber, also the temperature in the interior of the treatment chamber can be controlled.

The control unit preferably is an electrical control unit like for instance a programmable microcomputer.

The above-mentioned control also comprises a regulation of the mentioned parameters and components. For this purpose, the apparatus according to the invention preferably further includes one or several sensors, which detect various parameters of the apparatus and transmit said parameters to the control unit. The sensors can be sensors for detecting the temperature of the treatment liquid in the vapor generating unit, for detecting the filling level of the treatment liquid in the vapor generating unit, for detecting the temperature and the pressure of the vapor of treatment liquid as fed from the vapor generating unit to the treatment chamber, and for detecting the temperature and the oxygen content in the interior of the treatment chamber.

Moreover, the apparatus according to the invention includes an operating unit for selecting or setting relevant parameters for the treatment of the molded article. Said parameters preferably comprise the volumetric flow rate of the vapor of treatment liquid fed to the treatment chamber, the temperature in the interior of the treatment chamber, the duration of the treatment or of individual treatment steps, and predefined combinations of said parameters. The predefined parameter combinations can be stored in the control unit in the form of defined treatment programs and can be selected by the user of the apparatus at the operating unit.

According to a preferred embodiment, the control unit is adapted to:
  control the temperature in the interior of the treatment chamber during a pre-treatment step in order to heat the molded article to be treated up to an initial temperature which is higher than the room temperature,
  control the temperature in the interior of the treatment chamber, the flows of vapor of treatment liquid between the treatment chamber and the vapor generating unit and the duration of the treatment step during a treatment step which follows the pre-treatment step, and
  control the temperature in the interior of the treatment chamber and the feeding of purge gas to the treatment chamber during a post-treatment step which follows the treatment step.

It has been shown that particularly advantageous and easily reproducible results are obtained when the molded article to be treated will be subjected to a pre-treatment and/or a post-treatment prior to and after the actual treatment with vapor of treatment liquid.

By bringing, in a pre-treatment step, the temperature in the interior of the treatment chamber and, hence, also the temperature of the molded article to be treated to a predefined initial temperature which is higher than the room temperature, the temperature difference between the surface of the molded article and the fed vapor of treatment liquid can be fixed, which, in turn, influences the degree of condensation of the treatment liquid on the surface of the molded article. Therewith it can for instance be controlled whether a uniform film of treatment liquid is formed on the surface of the molded article, and thereby also the thickness of the formed film of treatment liquid can be influenced. Thus it can for instance be avoided that liquid drops will be formed that run off downwards and thereby will induce a non-uniform result of the smoothing of the surface.

The temperature up to which the molded article will be heated in the pre-treatment step is higher than the room temperature and usually is lower than the boiling point of the treatment liquid. In a special embodiment, the temperature can be controlled such that it is higher than the boiling point of the treatment liquid, whereby it is prevented that a treatment liquid will condense out on the surface of the molded article. In this case, the treatment liquid will only be brought into the surface of the molded article by absorption processes. The advantage of said embodiment is that a slower and thereby better controllable solubilization or solvation of the surface of the molded article will become possible, which, above all for molded articles with a finely structured surface, allows a gentler smoothing. Moreover, it will be avoided that condensed treatment liquid will run downwards along the surface of the molded article whereby the treatment or smoothing of the surface could become non-uniformly.

In the pre-treatment step, i.e. during the pre-treatment, or already prior to the start of the pre-treatment, a purge gas can be fed into the treatment chamber in order to guarantee that no explosive atmosphere will be formed in the interior of the treatment chamber.

It has also shown that better and more reproducible results will be obtained when the molded article will be subjected to a post-treatment after the actual treatment with vapor of treatment liquid. In a corresponding post-treatment step, the temperature in the interior of the treatment chamber will be lowered according to a predefined program.

As a purge gas can be fed to the treatment chamber in the pre-treatment step as well as also in the post-treatment step, the control unit is preferably adapted to control the feeding of the purge gas to the treatment chamber in the pre-treatment step as well as also in the post-treatment step.

Furthermore, the treatment chamber of the apparatus according to the invention includes a device for circulating the gas in the interior of the treatment chamber, preferably a fan or ventilator, in order to guarantee a contact as uniformly as possible of the entire surface of the molded article with the vapor of the treatment liquid. As the treatment liquids usually are flammable liquids, it is advantageous to arrange the drive of a fan or ventilator outside of the treatment chamber and to drive the fan or ventilator via a magnetic coupling.

Moreover, the apparatus according to the invention preferably includes a pressure regulating device for regulating the pressure at which the vapor generating unit provides the vapor of the treatment liquid. Thereby a uniform flow of vapor of treatment liquid to the treatment chamber and thereby also a uniform and reproducible treatment of the molded article can be guaranteed.

In a preferred embodiment of the apparatus according to the invention the heat transfer takes place in the heating elements and cooling elements by means of liquid transfer media. Said transfer media can be suitable heat transfer media and coldness transfer media (i.e. a coolant), as for instance temperature-resistant silicone oils, paraffin oils or glycol oils, but also water. For this purpose, the apparatus according to the invention can include a supply unit for supplying the heating elements with a heat transfer medium and for supplying the cooling elements with a coldness transfer medium.

The transfer media are preferably guided in a circuit, i.e. circulated, by means of pumps, wherein the circuit preferably further includes a reservoir for the heat transfer medium or the coldness transfer medium.

For safety reasons, the temperature of the heat transfer medium is preferably set such that it is lower than the ignition point of the used treatment liquid, preferably it is set to at least 10° C., further preferred to at least 20° C. below the ignition point.

The temperature of the coldness transfer medium is preferably set such that it lies above the freezing point of the used treatment liquid, preferably at least 10° C., further preferred at least 20° C. above the freezing point, In a further preferred embodiment, a heat pump is provided between the two circuits, i.e. the circuit of the heat transfer medium and the circuit of the coldness transfer medium, so that the energy consumption of the apparatus according to the invention can be kept low.

The components and surfaces of the apparatus according to the invention that can come into contact with the treatment liquid or the vapor of the treatment liquid are preferably made of a material that is resistant to the treatment liquid and to high temperatures of preferably up to at least 200° C. Suitable materials can be stainless steel, glass, ceramics but also special plastics like PTFE compounds.

With the apparatus according to the invention an improved process safety can be achieved, and no manual interventions are necessary any longer, as for instance the removal of the molded article to be treated from a treatment chamber in order to dry it in a separate drying device. As by the control unit in conjunction with the operating unit the relevant parameters for the treatment, in particular also predefined treatment programs, can be set or selected, the treatment can be carried out by a broader group of persons, and, furthermore, also more complex process managements are possible. By returning condensed treatment liquid and vapor of the treatment liquid within the apparatus back to the vapor generating unit, moreover also the consumption of treatment liquid can be reduced.

In the method according to the invention the generation of the vapor phase in step a) means that by the heating of the treatment liquid said treatment liquid will vaporize to such an extent that an atmosphere or gas space is created which mainly consists of a vaporous, i.e. gaseous treatment liquid, i.e. of vapor of the treatment liquid.

The exposure of the molded article to be treated to the vapor phase generated in step a) means that, in doing so, the molded article will either be surrounded completely by the generated vapor phase or that only a defined part of the molded article will be exposed to the vapor phase, i.e. will be brought into contact with the vapor phase. In this connection, the molded article can either be inserted into the vapor phase or the generated vapor phase, i.e. of vapor of the treatment liquid, can be fed to the molded article.

When the vapor of treatment liquid as generated in step a) is fed to the molded article, for instance by placing the molded article in the treatment chamber of the apparatus according to the invention and by introducing the vapor of treatment liquid generated in the vapor generating unit into the treatment chamber, the removal of the molded article from the vapor phase which is carried out in step c) can be achieved by terminating the feeding of the vapor of the treatment liquid to the molded article, preferably supported by the introduction of a purge gas in order to displace the still present vapor of the treatment liquid. Moreover, the treatment chamber can be cooled by means of the cooling element of the treatment chamber so that vapor of treatment liquid contained therein will condense out.

According to a preferred embodiment, the removal of a residual treatment liquid present on the surface of the treated molded article, which is carried out in step c), can be carried out in a post-treatment step in which the temperature to which the molded article is exposed is controlled and in which, if necessary, a purge gas is fed to the molded article. For this purpose, the temperature in the treatment chamber is controlled correspondingly and, if required, a purge gas is introduced through the inlet for a purge gas as provided in the treatment chamber. The purge gas preferably is an inert gas, as for instance argon or nitrogen.

In the present invention a smoothing of the surface of the molded article is preferably intended such that after the treatment the surface has an average roughness value $R_a$ of 6 μm or less, preferably of 4 μm or less, and particularly preferred of 2 μm or less, wherein the roughness values are determined according to the standard ISO 25178-601:2010-07 (Geometrical Product Specifications (GPS)—Surface texture: Planar—Part 601: Nominal characteristics of contact (stylus) instruments).

The inventors of the present invention have discovered that for the purpose of smoothing the surface of a molded article obtained by additive manufacturing an optimal treatment time preferably is 15 seconds to 15 minutes. The treatment time is that time during which the molded article to be treated is exposed to the vapor phase of the treatment liquid until the desired smoothing of the surface is achieved, i.e. until for instance an optically satisfying surface or a surface with a predetermined maximum average roughness value $R_a$ is obtained.

For shorter treatment times, i.e. treatment times of less than 15 s, it becomes increasingly difficult to control the process, whereby in particular the reproducibility is impaired. In contrast thereto, in case of longer treatment times, i.e. treatment times of more than 15 minutes, adverse effects will occur, as for instance an excessive swelling on the surface of the molded article. Moreover, in case of a treatment time which is too long, the molded article to be treated will not only be heated on the surface so that, due to the heating, changes in volume can occur and as a result thereof deformations and tensions in the molded article can occur. When the molded article contains cavities, additional undesired deformations can arise by the heating and the expansion of the air enclosed in the cavities.

In order to accomplish the above-mentioned optimal treatment time, the treatment liquid can be chosen accordingly. If, for instance, the treatment time is too short as the boiling point of the treatment liquid is so high that the process of solubilizing or solvating and of smoothing of the surface of the molded article takes place too fast, an azeotropic mixture which boils at a lower temperature can be used, and thereby the treatment time will be extended and the treatment becomes easier to control and to reproduce.

It is particularly preferred that the treatment time ranges from 20 seconds to 10 minutes, and even more preferred that it ranges from 30 seconds to 5 minutes.

When in the method according to the invention the molded article will be taken out of the vapor phase in step c) it is advantageous to remove any residual treatment liquid present on the surface of the molded article as fast as possible in order to stop the treatment. This also involves the removal of treatment liquid that has penetrated into the molded article due to a swelling of areas on the surface of the molded article during the exposure in step b).

The removal of residual treatment liquid present on the and/or in the surface of the treated molded article can be achieved by allowing it to evaporate, by an evaporation under the application of heat, by an evaporation under a reduced pressure, or by washing it off by means of a suitable cleaning fluid.

In case of relatively volatile solvents it may be sufficient to allow it or them to evaporate without any additional measures. In case of less volatile solvents the evaporation can be accelerated by heating the treated molded article and/or by reducing the pressure. The process of evaporation can further be accelerated by exposing the molded article to an air flow. Alternatively, the residual treatment liquid being present on the surface can also be washed off, wherein preferably a liquid is used which on the one hand can be mixed with the treatment liquid and on the other hand cannot dissolve or solubilize the plastic of which the molded article is made. There can also be used combinations of the mentioned measures for removing a residual treatment liquid.

According to a preferred embodiment, removing the molded article from the vapor phase is achieved by the termination of the feeding of vapor of treatment liquid to the molded article. Thereby it is not necessary to move the molded article so that the risk of a damaging of the possibly not yet completely hardened surface is avoided. This can furthermore be supported by feeding a purge gas. Said purge gas preferably is an inert gas, as for instance argon or nitrogen.

By the fact that the vapor phase was generated by heating the treatment liquid to its boiling point, i.e. by boiling the treatment liquid, the temperature of the vapor phase will approximately correspond to the boiling point of the treatment liquid. In contrast thereto, the molded article will usually have a lower temperature prior to the treatment so that the vaporous treatment liquid will condense at the surface of the molded article when the vapor phase and the molded article come into contact with each other. The extent of the condensation of the treatment liquid on the surface of the molded article is dependent inter alia on the temperature difference between the vapor phase and the molded article.

According to a preferred embodiment of the method according to the invention, the molded article to be treated is heated up to a predetermined temperature in a pre-treatment step prior to the step of exposing it to the generated vapor phase. Thereby the temperature difference between the vapor phase and the molded article can be predetermined and, thus, the process of condensation of a treatment liquid on the surface of the molded article can be controlled.

If, for instance, a relatively small temperature difference between the vapor phase and the molded article is stipulated, wherein the temperature of the molded article is lower than the temperature of the vapor phase, a relatively fine liquid film will be formed on the surface of the molded article and, thus, a more uniform smoothing of the surface will be obtained.

According to a further preferred embodiment of the method according to the invention, the molded article is heated up to a temperature which lies above the boiling point of the treatment liquid and below the softening point of the plastic. In this embodiment, it is prevented that a treatment liquid will condense on the surface of the molded article in step b). Rather, the vaporous treatment liquid solubilizes or solvates the surface of the molded article by being absorbed by said surface, and, in doing so, a layer is formed on the surface of the molded layer in which the plastic is present in an at least partially dissolved state. In this state, the plastic is softened at the surface which finally will effect a smoothing of the surface.

The advantage of said embodiment is that a slower and consequently better controllable solubilizing or solvating of the surface of the molded article is enabled which facilitates a gentler smoothing above all for molded articles with finely structured surfaces. Moreover, it is prevented that a condensed treatment liquid runs downwards along the surface of the molded article which could induce that the treatment or the smoothing of the surface will become non-uniformly.

Preferably, in the method according to the invention a pressure equalisation with the atmosphere is guaranteed by means of a suitable pressure equalising device. Thereby a discharge (transfer) of waste air to the atmosphere is enabled. When the waste air is discharged during and/or after the treatment, it is prevented that any solvent vapor which escapes from the treatment chamber or is discharged therefrom or which is generated in the vapor generating unit will find its way to the outside into the atmosphere. This can for instance be accomplished by a cooling element which is provided outside of the treatment chamber. The condensed treatment liquid obtained thereby can be used again in the apparatus according to the invention by returning it back to the vapor generating unit.

BRIEF DESCRIPTION OF THE DRAWING FIGURES

Further advantages and features of the present invention will become apparent on the basis of the description of embodiments as well as by means of the drawings.

DETAILED DESCRIPTION

In the following, processing examples will be described which demonstrate as an example the practical application of the method according to the invention for treating a molded article made of plastic.

In the processing examples, the treatment according to the invention was carried out in a cup-shaped container made of stainless steel or in case of small molded articles in a cup made of borosilicate glass. The container had a cross-section being circular in a plan view, had a flat bottom and was open to the top. At the bottom of the container there was installed a heating element by means of which a bowl being arranged above thereof and being open to the top can be heated. The treatment liquid was filled into the bowl in a quantity that was sufficient to generate a constant vapor phase of the treatment liquid in the container during the entire treatment duration. Above the heating element and the bowl there was installed a locating surface which was arranged and designed such that the molded article to be treated could be placed thereon and was then completely surrounded by the vapor phase of the treatment liquid generated in said container. Furthermore, the locating surface was designed such that it was not directly heated by the heating element.

For the carrying out of the treatment according to the invention, first of all the bowl with the treatment liquid was heated by means of the heating element until the treatment liquid began to boil and the container slowly began to fill with the vapor phase of the treatment liquid. By the vaporizing treatment liquid the vapor of which was heavier than air, the air was gradually displaced from the container, and the container was filled with the vapor phase. The filling level, i.e. the height up to which the vapor phase had risen in the interior of the container, was clearly perceptible by means of the treatment liquid condensed at the inner wall of the container.

As soon as the container was almost completely filled with the vapor phase of the treatment liquid, the molded article to be treated was placed on the locating surface in the interior of the container. After the expiration of the treatment time, the molded article was taken out again and left at a well ventilated place until the treatment liquid present on the surface was evaporated.

According to the above described method, the following processing examples 1 to 3 as listed below were carried out, wherein the following materials were used:

Plastics:
 ABS: A filament made of acrylonitrile butadiene styrene copolymer marketed under the trademark TITANX of the manufacturer Formfutura BV, HH Nijmegen, Netherlands, color: black, diameter of the filament 1.75 mm;
   A nozzle with an opening diameter of 0.6 mm was used;
 PP: a filament made of polypropylene marketed under the trademark CENTAUR PP of the manufacturer Formfutura BV, HE Nijmegen, Netherlands,
   color: natural, diameter of the filament 1.75 mm;
   A nozzle with an opening diameter of 0.6 mm was used;
Solvents:
 Methyl ethyl ketone (MEK): technically at least 97%, Bernd Kraft GmbH
 Toluene: technically at least 97%, VWR Chemicals
 n-propanol: marketed under the registered trademark EMPLURA®, Merck KGaA
 Acetic acid: 100%, technically, VWR Chemicals Processing Example 1

A molded article made of ABS, produced by means of additive manufacturing and having a length of approximately 5 cm, a width of approximately 5 cm and a height of approximately 9 cm was treated in the above described container made of borosilicate glass in compliance with the method according to the invention, wherein MEK (boiling point approximately 80° C.) was used as a treatment liquid. The molded article was heated up 85° C. prior to the treatment. The treatment time in the vapor phase amounted to 30 s.

Processing Example 2

A molded article made of PP, produced by means of additive manufacturing and having a length of approximately 48 cm, a width of approximately 8.5 cm and a height of approximately 20 cm was treated in the above-described container made of stainless steel in compliance with the method according to the invention, wherein a mixture of toluene/acetic acid with 72% by weight of toluene and 28% by weight of acetic acid (boiling point approximately 101° C.) was used as a treatment liquid. The molded article was not heated prior to the treatment and had room temperature. The treatment time in the vapor phase amounted to 30 s.

Figure 1A:
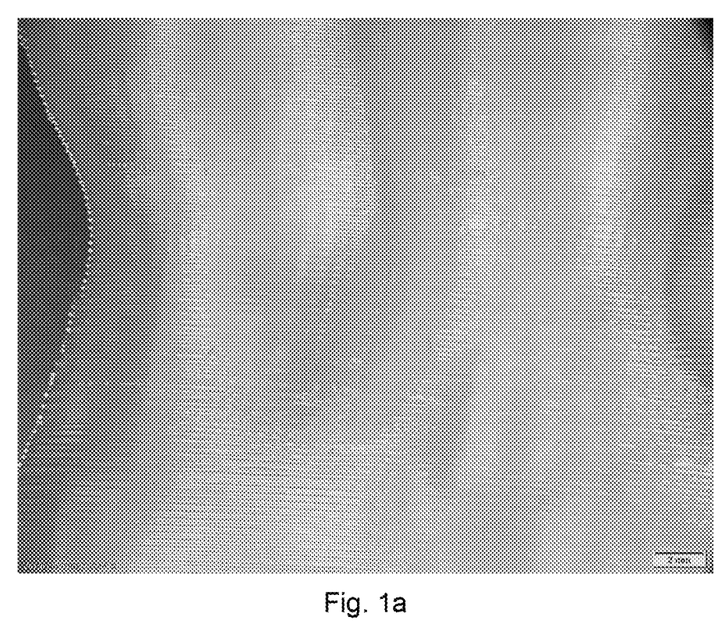
FIG. 1a is a photograph of a first point of the molded article made of PP as used in the processing example 2 prior to the treatment.
Figure 1B:
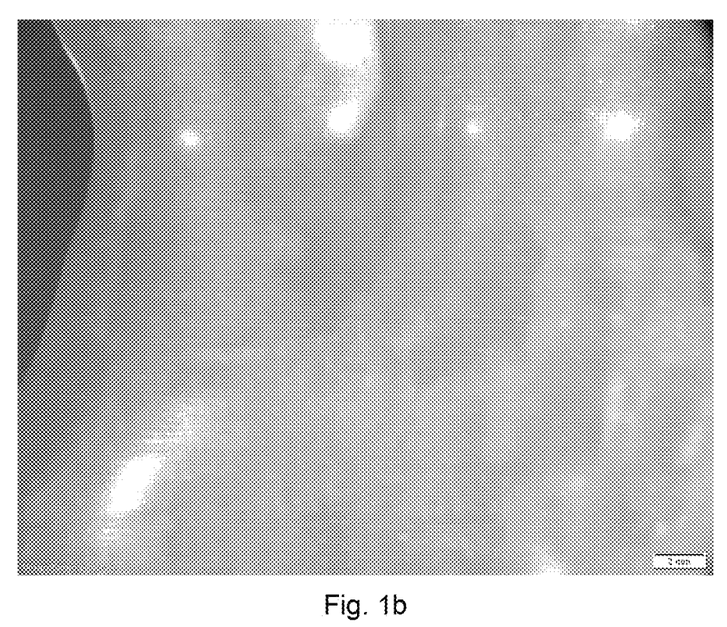
FIG. 1b is a photograph of a first point of the molded article made of PP as used in the processing example 2 after the treatment.
Figure 2A:
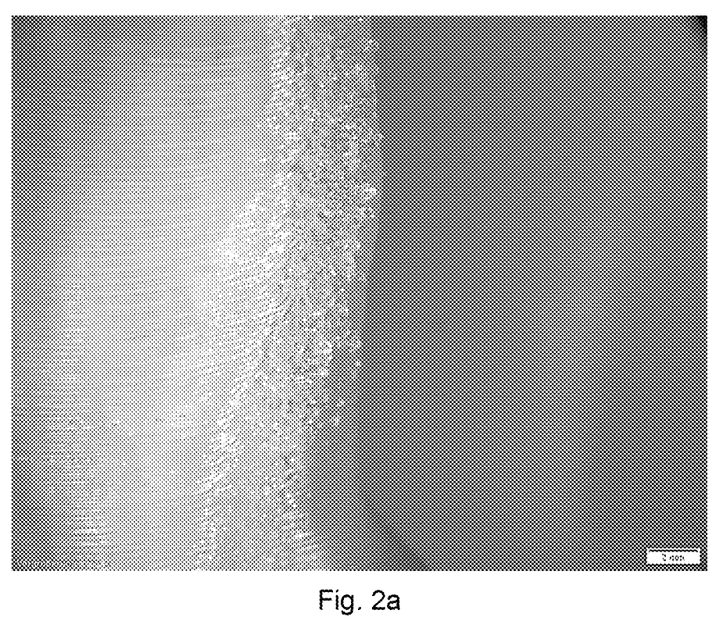
FIG. 2a is a photograph of a second point of the molded article made of PP as used in the processing example 2 prior to the treatment.
Figure 2B:
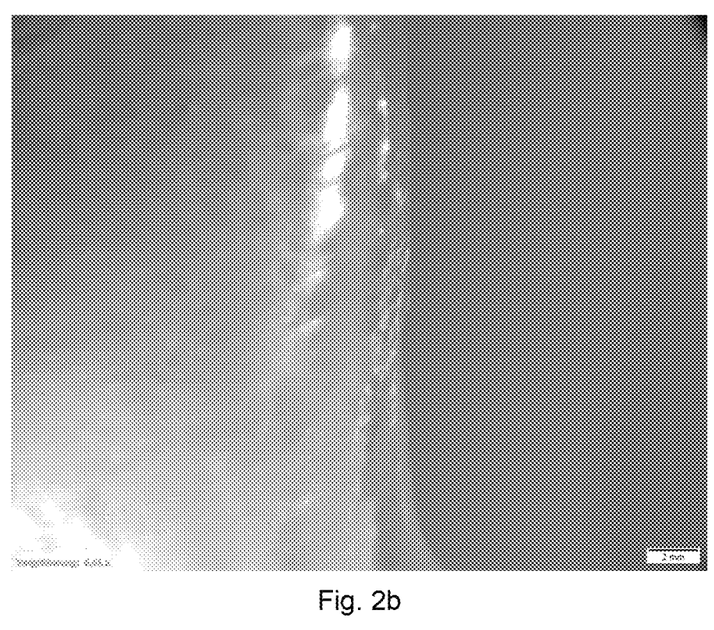
FIG. 2b is a photograph of a second point of the molded article made of PP as used in the processing example 2 after the treatment.

In addition, at two different points of the molded article made of PP photographs were taken respectively prior to the treatment and after the treatment in compliance with the method according to the invention, which photographs are represented in FIGS. 1a/1b and 2a/2b. The photographs show a clear smoothing of the surface by the method according to the invention so that the layer structure which had been clearly visible prior to the treatment was hardly recognizable anymore after the treatment.

Processing Example 3

Two molded articles made of PP, produced by means of additive manufacturing and respectively having a length of approximately 48 cm, a width of approximately 8.5 cm and a height of approximately 20 cm were treated in the above-described container made of stainless steel in compliance with the method according to the invention, wherein a mixture of toluene/n-propanol with 51% by weight of toluene and 49% by weight of n-propanol (boiling point approximately 93° C.) was used as a treatment liquid. The molded articles were not heated prior to the treatment and had room temperature. The treatment times in the vapor phase amounted to 30 seconds and 60 seconds, respectively.

In a visual inspection of the treated molded articles, a comparison of the results of the processing examples 1 to 3 showed that the molded article treated in the processing example 1 which was heated up to a temperature above the boiling point of the treatment liquid prior to the treatment had a gloss considerably higher than the molded article treated with the processing example 2 which was treated without any prior heating.

For an identical treatment time of 30 seconds the molded article made of PP and treated with the processing example 2 showed a better smoothing than the molded article made of PP and treated with the processing example 3. When the treatment time in the processing example 3 was extended to 60 s, the smoothing was similar to the one obtained in the processing example 2. Nevertheless, the gloss of the molded article made of PP which was treated with the processing example 3 seemed to be somewhat higher.

Processing Example 4

In this example, the result of the smoothing by means of the method according to the invention was compared with the result when using the alternative method for smoothing the surface by means of a grinding down of the irregularities.

For this purpose, two molded articles made of polypropylene (PP) were produced in an identical manner by means of an additive manufacturing (3D printing). One of the two molded articles was smoothed in a manner usual in prior art by means of grinding down the surface irregularities. The other one of the two molded articles was treated in compliance with the above-described method according to the invention.

For the used molded articles, the roughness of the surface was measured at different points by means of a stylus measuring instrument (measuring method according to ISO 25178-601:2010-07, used instrument: marketed under the trademark MARSURF®, model M300, manufacturer: Mahr GmbH) prior to the treatment and after the smoothing in compliance with the method according to the invention or after the smoothing by grinding down. In Table 1 the measured values are shown.

TABLE 1

| | Smoothing according to the invention | | Smoothing by grinding | | Untreated molded article | |
|---|---|---|---|---|---|---|
| | Ra/ μm | Rz/ μm | Ra/ μm | Rz/ μm | Ra/ μm | Rz/ μm |
| Point 1 | 1.295 | 6.061 | 7.488 | 41.05 | 12.44 | 58.16 |
| Point 2 | 1.167 | 5.823 | 5.778 | 30.48 | 10.58 | 54.89 |
| Point 3 | 1.609 | 7.204 | 5.847 | 34.12 | 14.03 | 71.59 |
| Point 4 | 1.6 | 7.592 | 5.908 | 30.62 | 12.11 | 60.52 |
| Point 5 | 1.263 | 5.845 | 7.894 | 46.34 | 12.96 | 62.52 |
| Point 6 | 1.083 | 5.845 | 5.153 | 34.18 | | |
| Point 7 | 1.456 | 7.161 | 5.153 | 31.8 | | |
| Point 8 | 1.489 | 7.65 | 4.83 | 31.83 | | |
| 50% quantile | 1.4 | 6.6 | 5.8 | 33.0 | 12.4 | 60.5 |
| Mean value | 1.4 | 6.6 | 6.0 | 35.1 | 12.4 | 61.5 |

The results clearly demonstrate that with the method according to the invention for treating a molded article made of plastic a much smoother surface could be obtained than with a smoothing treatment by grinding down the irregularities caused by the manufacturing. Moreover, the treatment time required therefor was significantly shorter, and, therefore, the method according to the invention was more suitable for the industrial application and the production of larger numbers of articles.

In the following, embodiments of the apparatus according to the invention are described on the basis of the pertaining figures.

First Embodiment of the Apparatus According to the Invention

Figure 3:
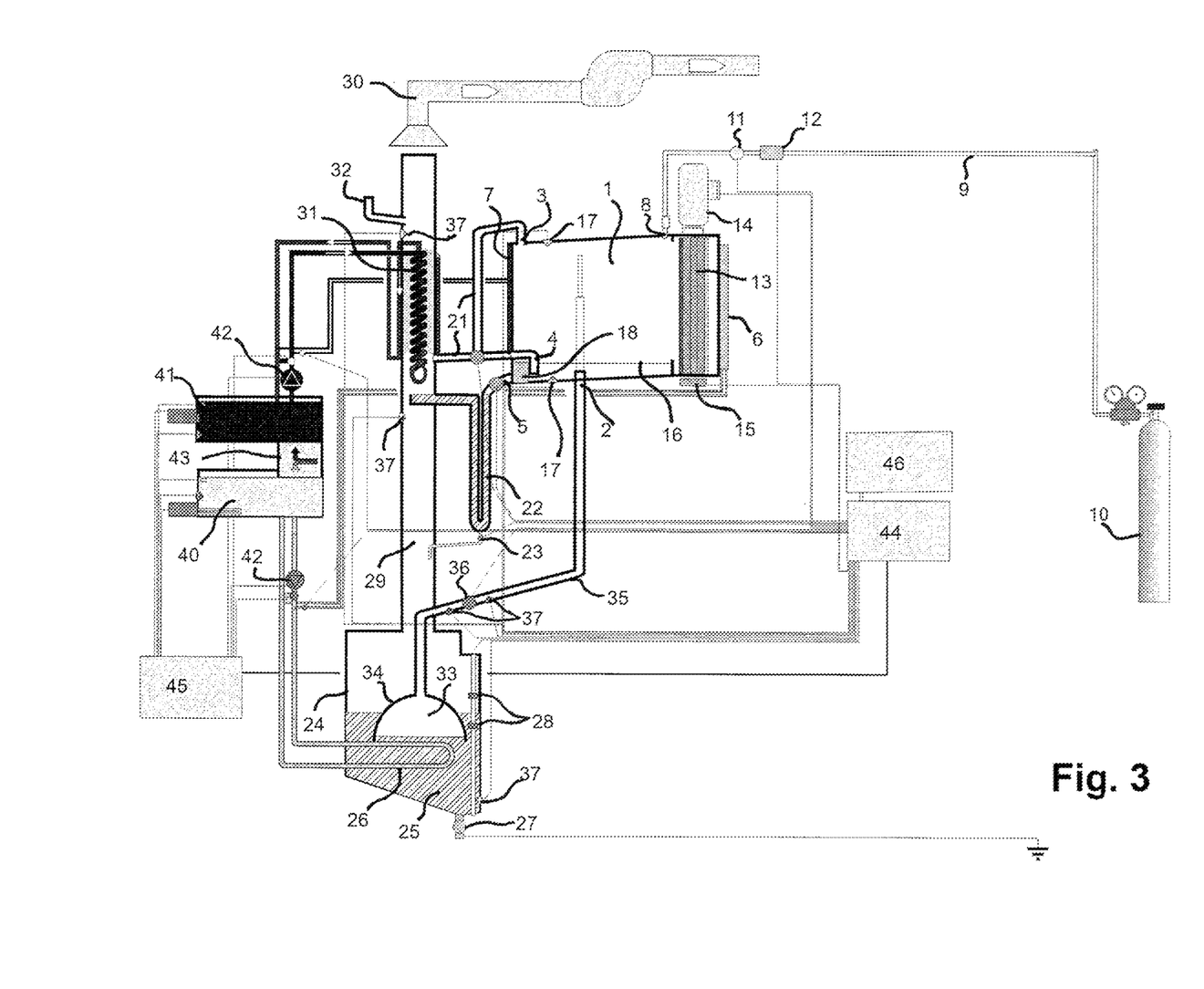
FIG. 3 shows a schematic representation for the illustration of a first embodiment of the apparatus according to the invention.

FIG. 3 shows a schematic representation for the illustration of a first embodiment of the apparatus according to the invention.

The apparatus includes a treatment chamber 1 with a closable door (not shown), an inlet 2 for the vapor of treatment liquid, an upper outlet 3 for vapor of treatment liquid, a lower outlet 4 for the vapor of treatment liquid, and an outlet 5 for condensed treatment liquid. For the regulation of the temperature in the treatment chamber there are provided a heating element 6, a cooling element 7 and temperature sensors 17. The treatment chamber further includes an inlet 8 for a purge gas, which inlet 8 is connected to a corresponding gas reservoir 10, like a gas bottle, via a gas pipe 9. In the gas pipe there are provided a purge gas switching valve 11 and a purge gas pressure sensor 12.

For a uniform distribution of the gases in the treatment chamber there is provided a fan or ventilator 13 which is driven via a magnetic coupling by a motor 14 arranged outside of the treatment chamber. Thereby it is prevented that an ignition source in the form of an electrical component is present in the interior of the chamber. For a monitoring of the fan or ventilator there is provided a rotation sensor 15 outside of the treatment chamber.

In the treatment chamber there is also provided a placement surface 16, for instance in the form of a perforated plate, on which the molded article to be treated can be positioned.

Furthermore, the apparatus includes a vapor generating unit in which a vapor of the treatment liquid is generated by means of a heating of the treatment liquid until it boils and which vapor of the treatment liquid is then fed to the treatment chamber 1. After the passage through the treatment chamber 1, the vapor of the treatment liquid which has been fed to the treatment chamber 1 will then be returned back again to the vapor generating unit via corresponding ducts 21. Moreover, the treatment liquid condensed in the treatment chamber 1 will be returned back to the vapor generating unit via a duct 22 having a siphon. If required, said siphon can be emptied via a shut-off valve 23 into the vapor generating unit. A filter 18 can be provided upstream of the outlet 5 for condensed treatment liquid.

In the lower part of the vapor generating unit there is provided a container 24 for the treatment liquid 25 in which the treatment liquid is heated by means of a heating element 26. The container 24 includes an outlet 27 which can be shut off, via which outlet 27 the container 24 can be emptied, if required. During the operation of the apparatus, the container 24 is filled approximately up to the halfway level with the treatment liquid 25. The filling level can be monitored by means of suitable filling level sensors 28.

The container 24 ends upwards in a tube 29 which extends further upwards and is open to the top. At the upper opening of the tube 29 there is arranged an exhaust system or waste air system 30 which sucks off gases escaping upwards from the vapor generating unit.

In the upper part of the tube 29 there is provided a cooling element 31, for instance in the form of a spiral condenser, by means of which the vapor of the treatment liquid which ascends in the tube can be condensed, and the condensed treatment liquid flows back downwards into the container 24. Thereby it is prevented that a vapor of treatment liquid escapes to the outside of the apparatus. The vapor of the treatment liquid which exits from the treatment chamber 1 through the outlets 3, 4 will be returned via the return ducts 21 of the cooling element 31 back to the vapor generating unit so that the vapor of the treatment liquid condenses out and the condensed treatment liquid will also flow back downwards into the container 24. In the upper part of the tube 29 above the cooling element 31 there is furthermore provided a filling port 32 for a treatment liquid.

Furthermore, the vapor generating unit includes a pressure increasing device 33 in the form of a hemisphere 34 open to the bottom, said hemisphere 34 immersing from above into the treatment liquid 25 in the container 24. At the top of the hemisphere 34 being open to the bottom there is connected a duct 35 for a vapor of a treatment liquid via which the vapor of treatment liquid generated in the vapor generating unit is guided to the inlet 2 of the treatment chamber 1. In the duct 35 there is provided a shut-off valve 36.

During the operation of the heating element 26 the vapor of treatment liquid generated at the heating element 26 enters from below into the hemisphere 34, accumulates therein and in part displaces the treatment liquid being present therein. By the arising level difference of the treatment liquid within and outside of the hemisphere 34, the vapor of treatment liquid is under a slight excess pressure within the hemisphere 34 due to which the vapor of the treatment liquid can be fed to the treatment chamber 1. As a result thereof, no mechanical pump is required, i.e. it can be dispensed with a pump. The excess pressure, i.e. the extent of the pressure increase, can be set via the filling level of the treatment liquid 25 in the container 24 or via the immersion depth of the hemisphere 34 into the treatment liquid 25.

For a more accurate control of the vapor generation, in the container 24 for the treatment liquid, in the tube 29 and in the duct 35 there are provided several temperature sensors 37.

In the apparatus of FIG. 3, in the heating elements 6 and 26 as well as also in the cooling elements 7 and 31 the heat transfers are accomplished by means of liquid transfer media. Said transfer media can be suitable heat transfer media and coldness transfer media, as for instance temperature-resistant silicone oils, paraffin oils or glycol oils, but also water. For this purpose, the heating elements 6 and 26 are connected via a corresponding fluid lines with a reservoir 40 for a hot transfer medium (heat transfer medium), and the cooling elements 7 and 31 are connected via corresponding fluid lines with a reservoir 41 for a cold transfer medium (coldness transfer medium). The transfer media are circulated, i.e. guided in a circuit, by means of pumps 42. The reservoirs 40, 41 are electrically heated or cooled.

In order to keep the energy consumption of the apparatus according to the invention low, a heat pump 43 is provided between the two circuits, i.e. the circuit of the heat transfer medium and the circuit of the coldness transfer medium. In the apparatus of FIG. 3, the heat pump 43 is arranged between the reservoir 40 for a hot transfer medium and the reservoir 41 for a cold transfer medium.

Furthermore, the apparatus according to the invention of FIG. 3 includes a control unit 44 which is connected via control lines with the valves and sensors of the apparatus, so that measuring values as for instance temperature, pressure and filling level as well as also the position of the individual valves can be detected and the valves can be controlled correspondingly, in order to open them, to switch them or to close them, or in order to appropriately regulate the through-flow through the valves. Moreover, the control unit 44 is connected with the motor 14 and the rotation sensor 15 so that thereby also the operation of the fan or ventilator 13 can be controlled and monitored. Furthermore, the control unit 44 also has a separate control device for the heating and cooling elements which is connected via control lines with the valves and sensors of the cooling and heating circuit as well as also with the control unit 44.

Moreover, the apparatus of FIG. 3 includes an operating unit 46 which is connected to the control unit 44 and at which the relevant parameters for the treatment, in particular also predefined treatment programs, can be set or selected. Consequently, the treatment can be carried out by a broad group of persons, and, furthermore, also more complex process managements are possible.

Second Embodiment of the Apparatus According to the Invention

Figure 4:
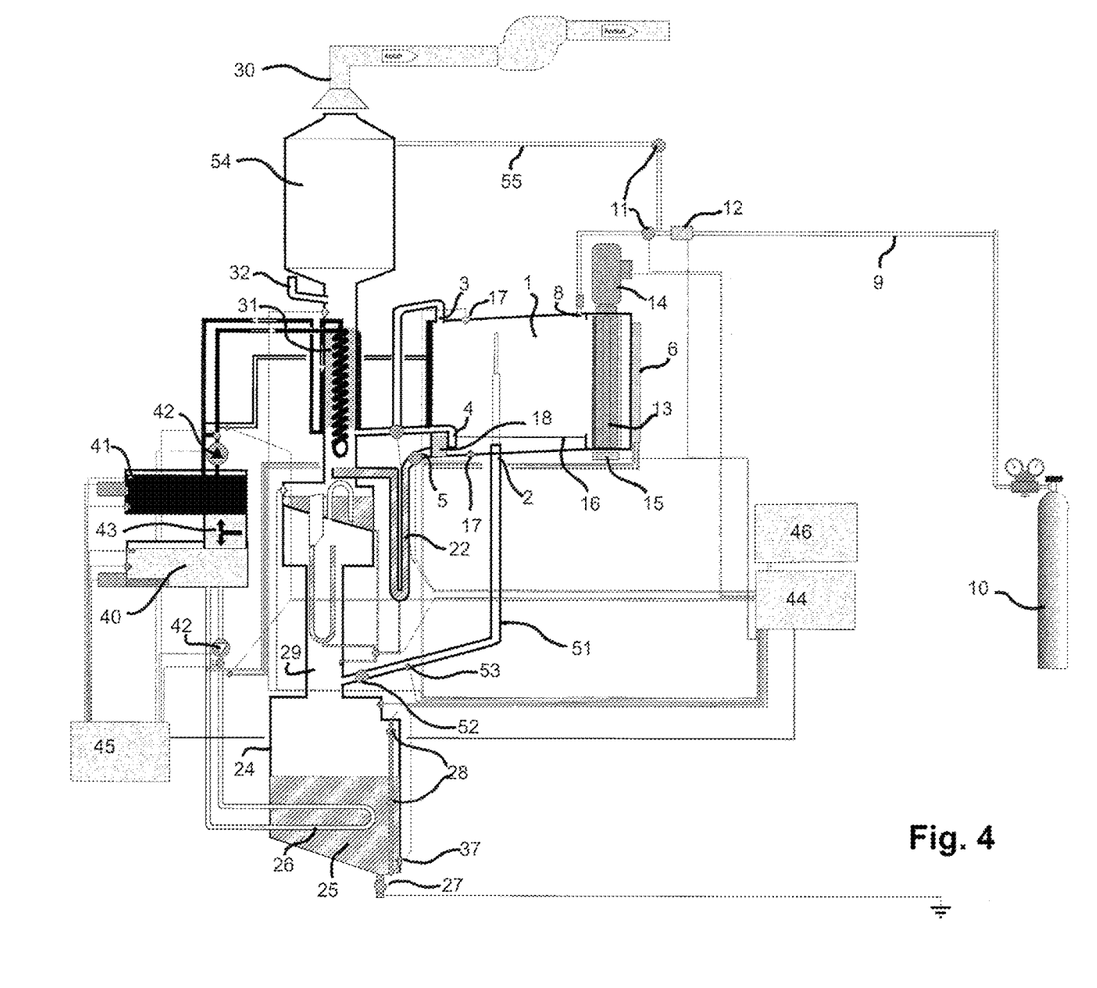
FIG. 4 shows a schematic representation for the illustration of a second embodiment of the apparatus according to the invention.

In the following, the apparatus according to the invention as represented in FIG. 4 will be described, wherein those elements which are identical with the apparatus of FIG. 3 will not be described in detail as these have already been described above.

The apparatus in FIG. 4 differs from the apparatus in FIG. 3 by the design of the vapor generating unit, in particular by the design of the pressure increasing device 50. Said pressure increasing device 50 is arranged in the tube 29 between the container 24 for the treatment liquid and the cooling element 31 and will be explained in more detail by means of the detail enlargement in FIG. 5.

In contrast to the apparatus in FIG. 3, in the apparatus in FIG. 4 the vapor of treatment liquid generated in the container 24 is directly fed to the inlet 2 for a vapor of treatment liquid of the treatment chamber 1 via a duct 51 for the vapor of treatment liquid. In the duct 51 there are provided a shut-off valve 52 and a temperature sensor 53. Between the cooling element 31 and the exhaust system or waste air system 30 there is further arranged a pressure equalising container 54. The pressure equalising container 54 is connected to the purge gas pipe 9 with a purge gas switching valve 11 via a purge gas pipe 55. Via the purge gas pipe 55, the purge gas can be introduced into the pressure equalising container 54 in order to form therein a layer of purge gas as a protective gas layer so that it is guaranteed that in case of sudden pressure fluctuations no vapor of treatment liquid will escape from the apparatus. Thereby it is also guaranteed that no air (oxygen) can penetrate into the apparatus and a flammable or explosive gas mixture can be generated.

Figure 5:
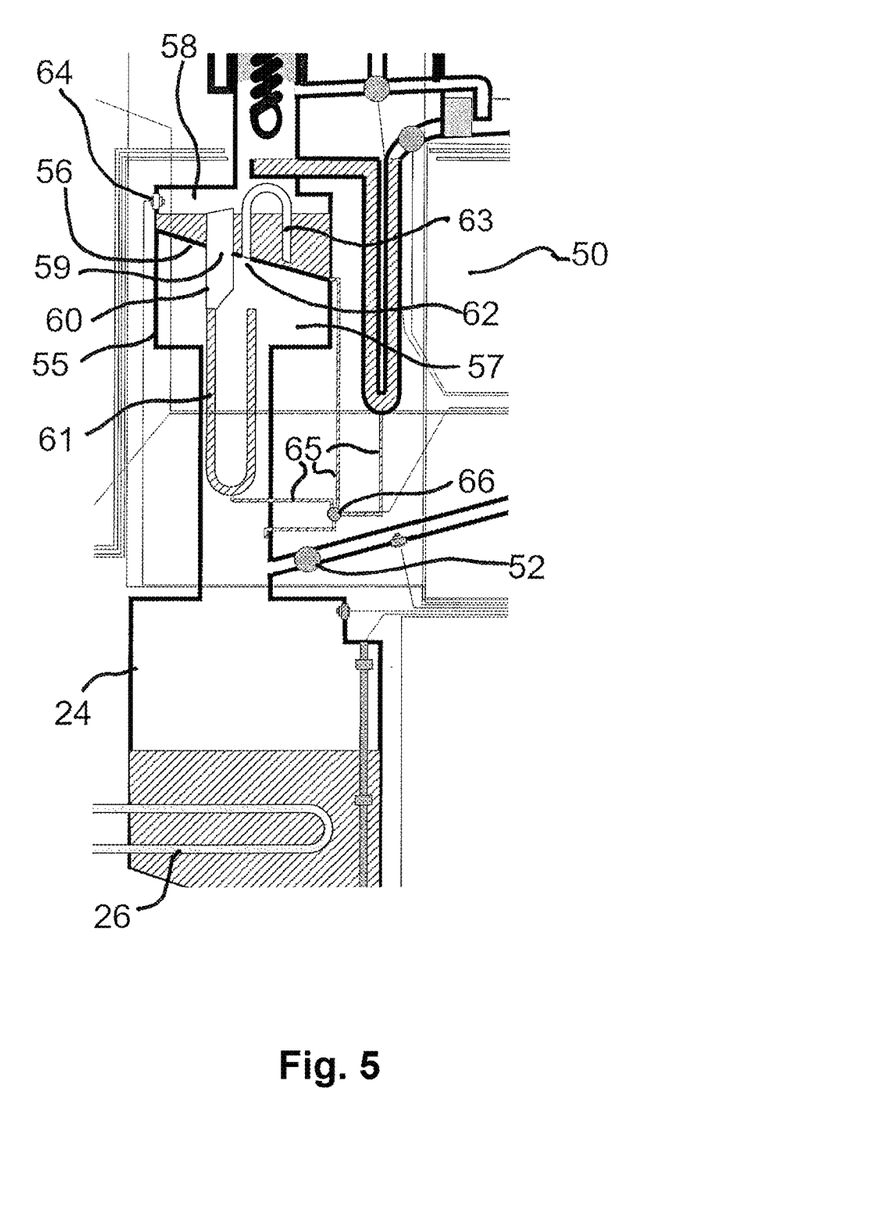
FIG. 5 shows an enlarged view of the pressure increasing device of the apparatus in FIG. 4.

In FIG. 5 the pressure increasing device 50 of the apparatus of FIG. 4 is shown in an enlarged view. The pressure increasing device 50 is accommodated in a housing 55 which is connected to the container 24 for the treatment liquid via the tube 29 and which is subdivided into a lower section 57 and an upper section 58 by means of a separating wall 56 extending obliquely downwards. In the separating wall 56 there is provided a first passage 59 through which a tube 60 is guided which is chamfered at the upper end which lies in the upper section 58, and which is tapered at the lower end which lies in the lower section 57, and which is connected with a first U-shaped tube 61 being open towards the top. The first U-shaped tube 61 is oriented such that its free leg does not touch the separating wall 56 and, thus, is open for a fluid passage.

In a second passage 62 which has a smaller diameter than the first passage 59, a second U-shaped tube 63 is arranged which extends upwards and is open to the bottom. The second U-shaped tube 63 is oriented such that its free leg does not touch the separating wall 56 and, thus, is open for a fluid passage. The second U-shaped tube 63 is dimensioned such that its upper end lies above the upper end of the tube 60.

During the operation of the apparatus the upper section 58 is filled with treatment liquid up to the upper chamfered end of the tube 60. Above the liquid level in the upper section 58 there is provided a temperature sensor 64 at the housing 55.

When the vapor generating unit will be put into operation prior to the start of the actual treatment of the molded article, i.e. before the vapor of treatment liquid is fed to the treatment chamber 1, an excess pressure is created by the vaporizing treatment liquid in the section above the container 24 for treatment liquid and, consequently, also in the lower section 57, as the shut-off valve 52 is closed. Thereby the liquid in the free leg of the second U-shaped tube 63 will be displaced downwards until the second U-shaped tube 63 is completely filled with vapor of the treatment liquid. If further vapor of the treatment liquid is generated, said vapor bubbles upwards out of the second U-shaped tube 63 through the treatment liquid in the upper section 58 and is condensed at the cooling element 31. The condensate drops downwards into the upper section 58 and runs via the tube 60 into the first U-shaped tube 61 and out of the free leg of the first U-shaped tube downwards into the container 24. At this point of time an equilibrium is established with regard to the pressure in the gas space of the lower section 57 and the container 24, wherein the resulting excess pressure is fixed by the difference in level between the surface of the liquid in the upper section 58 and the lower end of the free leg of the second U-shaped tube 63. To prevent any pressure from escaping out of the lower section 57 through the second U-shaped tube 61 upwards, the free leg of the first U-shaped tube 61 has to be longer than the free leg of the second U-shaped tube 63.

In order to be able to empty the vapor generating unit for a change of the treatment liquid, drain lines 65 are connected with the lower end of the first U-shaped tube 61, the lower end of the siphon in the return duct 22 for condensed treatment liquid and with the lowest point in the upper section 58 with a shut-off valve 66 via which the treatment liquid can be drained from said components into the container 24 for the treatment liquid.

As in the apparatus in FIG. 3, also in the apparatus in FIG. 4 and FIG. 5 the respective sensors and valves are connected to the control unit 44 via control lines.

By means of the pressure increasing devices in the apparatuses according to the invention, a vapor of a treatment liquid can be held available with a given excess pressure so that the treatment chamber can be filled with a vapor of a treatment liquid in the shortest of time.

The invention claimed is:

1. An apparatus for treating a molded article made of plastic with vapor of a treatment liquid, wherein the apparatus comprises:
    a treatment chamber which is closable and configured to be temperature-controlled for accommodating and treating the molded article,
    a vapor generating unit for providing a vapor of a treatment liquid, the vapor generating unit being spatially separate from the treatment chamber,
    a fluid connection between the treatment chamber and the vapor generating unit which is configured to be shut off and is suitable for feeding the vapor of the treatment liquid to the treatment chamber and returning condensate back to the treatment chamber, and
    a pressure equalizing device for transferring waste air at atmospheric pressure, which device is suitable for enabling pressure equalization with the atmospheric pressure during the treatment, and which includes a device which retains the vapor of the treatment liquid and is suitable for preventing the escape of the vapor of the treatment liquid into the atmosphere.

2. The apparatus according to claim 1, wherein the treatment chamber comprises a closable opening for loading the treatment chamber with the molded article to the treated, an inlet and an outlet for the vapor of the treatment liquid, one outlet for condensed treatment liquid, and a heating element as well as a cooling element for controlling a temperature of an interior of the treatment chamber.

3. The apparatus according to claim 1, wherein the treatment chamber comprises a gas inlet for a purge gas.

4. The apparatus according to claim 1, wherein the vapor generating unit comprises a container for holding the treatment liquid, a heating element for heating the treatment liquid to a boiling point, a pressure increasing device for increasing the pressure of the vapor of the treatment liquid by a predetermined pressure, and a cooling element for condensing an excess amount of the vapor of the treatment liquid.

5. The apparatus according to claim 3, wherein the fluid connection comprises devices for feeding the vapor of the treatment liquid from the vapor generating unit to the treatment chamber, for returning the vapor of the treatment liquid from the treatment chamber back to the vapor generating unit, for returning condensed treatment liquid from the treatment chamber back to the vapor generating unit, and for feeding the purge gas to the treatment chamber, wherein the devices for feeding and returning include shut-off devices.

6. The apparatus according to claim 3, further comprising a control unit for controlling a flow of the vapor of the treatment liquid between the treatment chamber and the vapor generating unit, a flow of condensed treatment liquid returning from the treatment chamber back to the vapor generating unit, and for controlling a temperature of the treatment chamber.

7. The apparatus according to claim 6, wherein the control unit controls a feeding of the purge gas to the treatment chamber.

8. The apparatus according to claim 7, wherein the control unit is adapted to:
    control the temperature of the treatment chamber during a pre-treatment step in order to heat the molded article to be treated up to an initial temperature which is higher than a room temperature,
    control the temperature of the treatment chamber, the flow of the vapor of the treatment liquid between the treatment chamber and the vapor generating unit, and a duration of a treatment step which follows the pre-treatment step, and
    control the temperature of the treatment chamber and the feeding of the purge gas to the treatment chamber during a post-treatment step that follows the treatment step.

9. The apparatus according to claim 8, wherein the control unit is adapted to feed the purge gas to the treatment chamber in the pre-treatment step.

10. The apparatus according to claim 1, further comprising an operating unit for selecting or setting relevant parameters for a treatment of the molded article.

11. The apparatus according to claim 10, wherein the relevant parameters include one or more of:
    a volumetric flow rate of the vapor of the treatment liquid fed to the treatment chamber,
    a temperature of the treatment chamber, and
    a duration of the treatment of the molded article or of individual treatment steps.

12. The apparatus according to claim 1, further comprising a distribution device in the treatment chamber, the distribution device configured for distributing the vapor fed from the vapor generating unit in an interior of the treatment chamber.

13. The apparatus according to claim 1, further comprising one or more sensors configured to measure a value of one of the following variables;
    a temperature of the treatment liquid in the vapor generating unit,
    a filling level of the treatment liquid in the vapor generating unit,
    a temperature of the vapor of the treatment liquid as fed from the vapor generating unit to the treatment chamber, a temperature in an interior of the treatment chamber, and an oxygen content of the treatment chamber, wherein the value is transmitted to the control unit.

14. The apparatus according to claim 1, wherein the treatment chamber includes a device for circulating a gas in an interior of the treatment chamber.

15. The apparatus according to claim 1, further comprising a pressure regulating device for regulating a pressure at which the vapor generating unit provides the vapor of the treatment liquid.

16. The apparatus according to claim 2,
wherein a heat transfer takes place in the heating element and the cooling element via liquid transfer media, and
wherein the apparatus includes a supply unit for supplying the heating element with a heat transfer medium and for supplying the cooling element with a cooling transfer medium.

17. The apparatus according to claim 16, wherein the heat transfer medium is circulated in a first circuit and the cooling transfer medium is circulated in a second circuit, and a heat pump is provided between the first circuit and the second circuit.

18. The apparatus according to claim 1, wherein the treatment chamber includes a device for positioning the molded article during an entire duration of a treatment.

* * * * *